April 18, 1961 F. ZYLSTRA 2,980,122
MILKING EQUIPMENT WASHER
Filed Feb. 27, 1958 3 Sheets-Sheet 1

Fred Zylstra
INVENTOR.

April 18, 1961 F. ZYLSTRA 2,980,122
MILKING EQUIPMENT WASHER
Filed Feb. 27, 1958 3 Sheets-Sheet 2
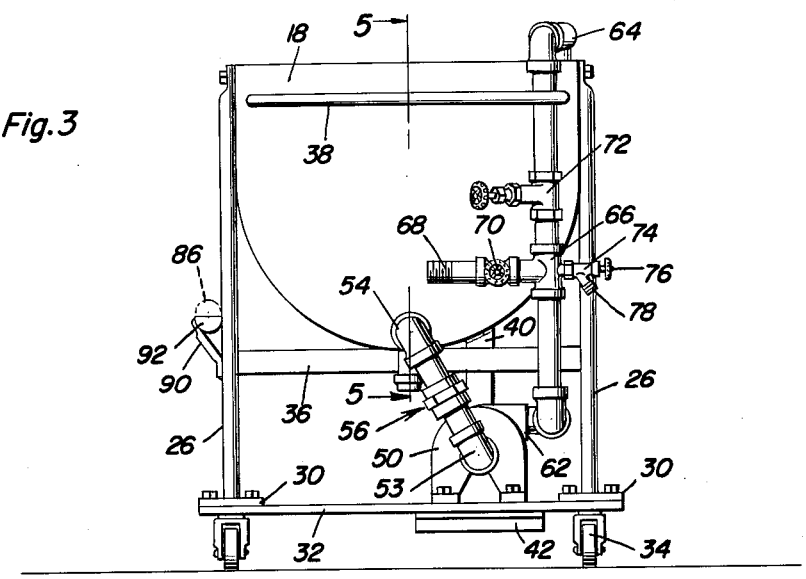
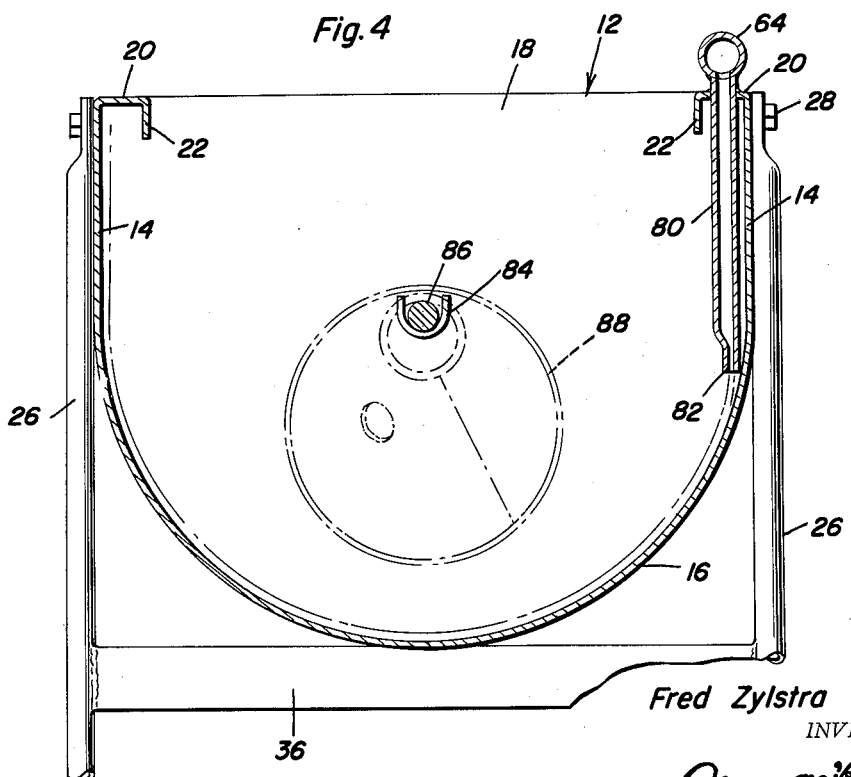
Fred Zylstra
INVENTOR.

April 18, 1961 F. ZYLSTRA 2,980,122
MILKING EQUIPMENT WASHER
Filed Feb. 27, 1958 3 Sheets-Sheet 3

Fred Zylstra
INVENTOR.

BY *Clarence A. O'Brien*
*and Harvey B. Jacobson*
Attorneys

United States Patent Office 2,980,122
Patented Apr. 18, 1961

2,980,122

MILKING EQUIPMENT WASHER

Fred Zylstra, 631 3rd Ave. NE., Sioux Center, Iowa

Filed Feb. 27, 1958, Ser. No. 717,952

7 Claims. (Cl. 134—169)

The present invention generally relates to cleaning apparatus and more particularly to a washer particularly adapted for use in efficiently and economically cleaning milking equipment and especially that type of equipment used in creameries. In dairy equipment, quite often a hard mineral deposit is left on the equipment after use and this deposit sometimes called "milk stone" is extremely difficult to remove. Accordingly, it is the primary object of the present invention to provide a washer particularly adapted for receiving various articles employed in conjunction with a dairy or creamery and effectively and efficiently cleaning such items.

A further object of the present invention is to provide a machine for washing dairy equipment by employing high velocity cleaning solution such as water and detergent together with a tank and means for holding the articles to be cleaned within the tank with a high pressure pump being provided with a suction from the tank so that the cleaning solution may be recirculated.

A further object of the present invention is to provide a piping system arranged with fittings so that the circulating system may be connected to pipe lines or other in-place equipment in dairies or food processing plants with the supply tank benig utilized in the system.

A further important feature of the present invention is to provide a multi-purpose washer for quickly and thoroughly washing various dairy equipment such as separator and clarifier disk, sanitary fittings, homogenizer parts, sample jars and many other similar items.

Other objects of the present invention will reside in its simplicity of construction, ease of operation, utility for various purposes and its relatively inexpensive manufacturing costs.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

Figure 3 is an end view illustrating the piping arrangement and structure of the tank and relation of the pump to the tank;

Figure 4 is a transverse sectional view taken substantially upon a plane passing along section line 4—4 of Figure 1 illustrating the construction of the tank and the discharge jets together with the manner of supporting articles within the tank;

Figure 1:
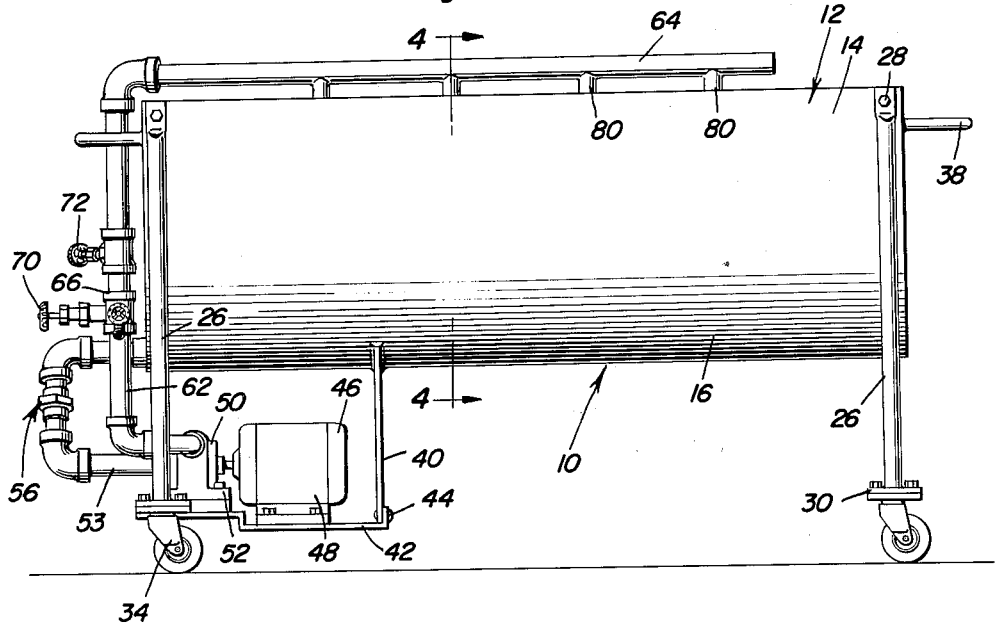
Figure 1 is a side elevational view of the washer of the present invention.
Figure 2:
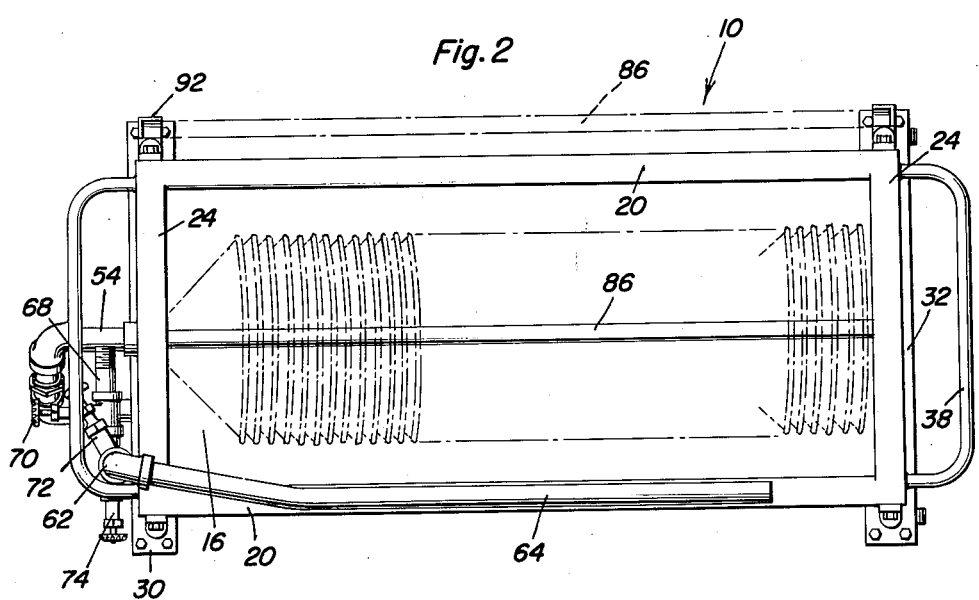
Figure 2 is a plan view of the construction of Figure 1.

Referring now specifically to the drawings, the numeral 10 generally designates the washer of the present invention which incorporates an enlarged tank generally designated by the numeral 12 and including vertical side walls 14 which are interconnected by and merge into a semi-cylindrical bottom wall 16. The walls 14 and 16 are interconnected by end walls 18 all of which cooperate to form an enlarged tank having an open upper end. The vertical side walls 14 terminate in inturned flanges 20 which in turn terminate in downturned flanges 22 which are in spaced parallel relation to the vertical walls 14 and form a reversely bent flange at the upper edge of each vertical wall 14. Each of the end walls 18 is also provided with an inturned flange 24 which cooperates with the inturned flange 20 to provide a horizontal flange completely around the periphery of the open end of the tank 12.

For supporting the tank 12 there is provided four vertically extending legs 26 with a leg being disposed at each corner of the tank 12 and the legs 26 may preferably be of tubular construction and secured to the tank 12 by fastening bolts 28. The lower end of each of the legs 26 is provided with a flange 30 and the flanges 30 on each pair of legs 26 are interconected by a transverse plate 32 which extends in a horizontal manner. At each end of the plate 32 there is provided a supporting wheel 34 which may be a caster wheel of any suitable construction which may swivel about a vertical axis while the wheel rotates also about a horizontal axis. A horizontal brace 36 is also provided between the end legs 26 which passes immediately under the ends of the tank 12 as illustrated in Figure 4 which also provides additional support for the tank 12 and provides a rigid supporting unit for the tank 12 whereby the unit is mobile due to the caster wheels 34.

To facilitate moving of the tank, there is provided a horizontally disposed U-shaped handle 38 on each end wall 18 and the handle 38 is at a convenient height so that an operator may engage the handle 38 and move the washer in any desired position.

Rigidly connected to the undersurface of the semi-cylindrical wall 16 of the tank 12 is a depending supporting bracket 40 which has a horizontally disposed supporting plate 42 connected to the lower end thereof by fastening means 44. The other end of the plate 42 is supported from the adjacent transverse plate 32 by any suitable means such as welding or the like. Mounted on the supporting plate 42 is an electric motor 46 which is held in position by a bracket 48. The motor 46 drives a fluid pump 50 also supported along the plate 42 by a hold-down bracket 52.

The pump 50 is provided with a centrally arranged inlet pipe 53 which is connected to a pipe 54 communicating through the end wall 18 into the interior of the tank with this connection being accomplished by various fittings and couplings generally designated by the numeral 56. Included in the fittings and couplings is a T-fitting 58 having a removable closure cap 60 thereon. The pump 50 is also provided with a tangential discharge line or pipe 62 extending longitudinally to the exterior of the tank and then vertically alognside the end wall 18 in offset relation to the center of the tank with the pipe extending upwardly through the handle 38 and communicated with an elongated longitudinally disposed header or manifold 64. In the vertical run of the discharge pipe 62, there is provided a T-coupling 66 having a threaded nipple 68 communicated therewith with a valve 70 being provided between the nipple 68 and the T-coupling 66 for a purpose described hereinafter. Above the T-coupling 66 is a valve 72. Also connected with the T-coupling 56 is a Y-coupling or fitting 74 provided with a hand valve 76 and a fitting 78 for receiving a hose all for a purpose described hereinafter.

The header or manifold 64 is provided with a plurality of down pipes 80 communicated therewith and extending in depending parallel relation and secured to the pipe 64 by suitable welding or the like. The down pipes 80 may also be termed jet pipes and they extend downwardly through the horizontal flange 20 on one vertical wall 14 and may be welded to the horizontal flange 20 for support. The lower ends of the pipes 80 are flattened and restricted as indicated by the numeral 82 and terminate adjacent the semi-cylindrical curved wall 16 and are substantially tangential to the inner surface of the semi-cylindrical wall 16 whereby water discharged from the restricted orifice 82 will generally follow the inner surface of the semi-cylindrical wall 16 and then up the opposite vertical side wall 14. The water is under a relatively high pressure and is discharged from the restricted orifices 82 at a relatively high velocity. After the water is discharged into the tank, it may be taken back into the pump through the suction line 54 in a manner described hereinafter.

Figure 5:
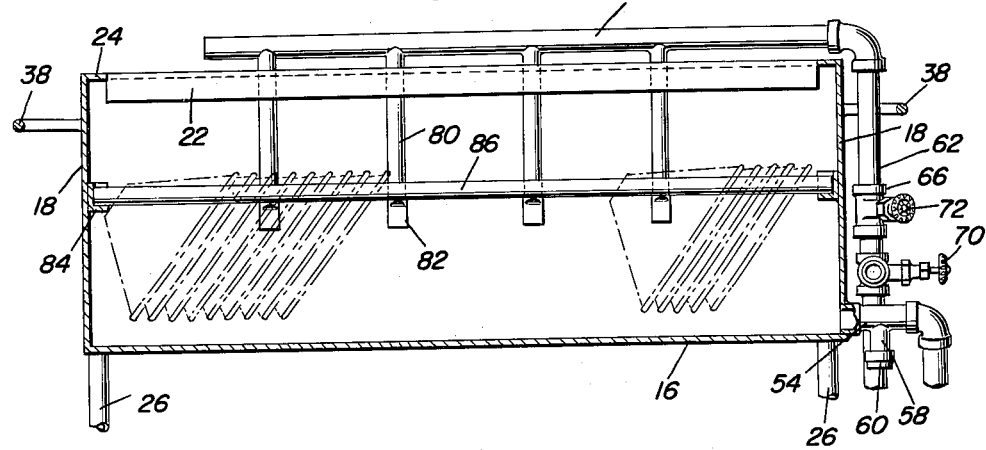
Figure 5 is a longitudinal, section view taken substantially upon a plane passing along section line 5—5 of Figure 3 illustrating further structural details of the washer.

Disposed on each end wall 18 adjacent the center of the inner surface thereof is a U-shaped clip 84 for supporting an elongated tubular rod 86 for holding the equipment such as separator disk 88 shown in dotted line in Figures 4 and 5. On the front of the machine and supported from the legs 26 is a pair of brackets 90 having inwardly opening cup-shaped members 92 thereon for receiving the tubular rod 86 when it is not being used. These brackets may also be used for storing the rod 86 when the disks 88 are positioned thereon or for storing the rod when it is not in use.

Figure 6:
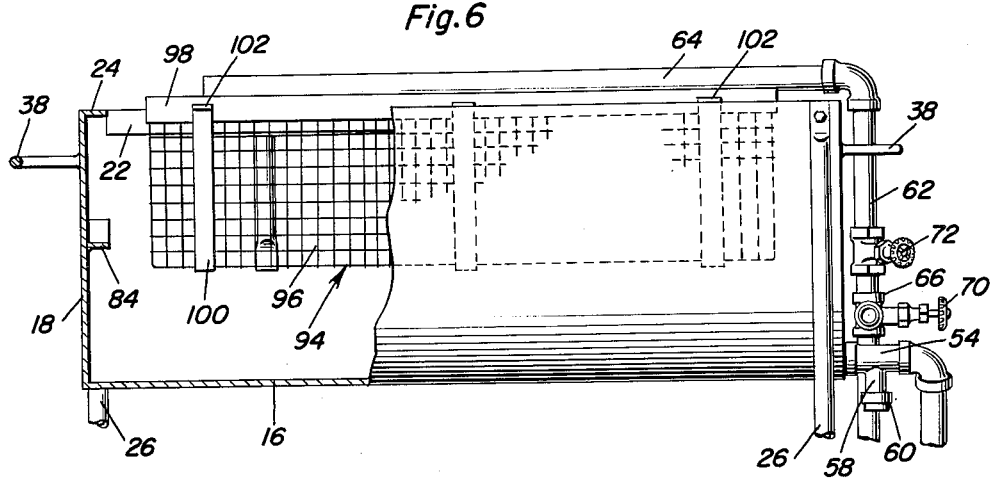
Figure 6 is an elevational from the rear with parts broken away illustrating a wire basket for holding small parts.
Figure 7:
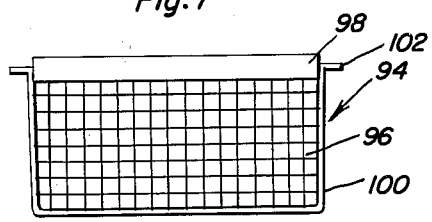
Figure 7 is an end view of the basket insert.

In Figures 6 and 7, there is illustrated a receptacle generally designated by the numeral 94 which is of elongated rectangular construction and is constructed of wire mesh material 96 having relatively large openings therein with the upper edge of the wire mesh material 96 having a peripheral reinforcing ring 98 and there is also provided a plurality of U-shaped reinforcing members 100 secured to the ring 98 and extending under the basket or receptacle 94 for reinforcing the wire mesh material 96. The terminal ends of the U-shaped members 100 are outturned as designated by the numeral 102 for purposes of forming a horizontal series of lugs for resting against the horizontal flanges 20 thus forming a support for the wire basket or receptacle 94 with the bottom and major part of the wire meshed receptacle being disposed below the bottom edges of the flanges 22.

Any number of jet orifices may be used with the water being forced downwardly through the jets and sweeping around the bottom of the tank and then up the opposite side wall and against the two inch wide horizontal flange with this flange and the depending three-quarter inch flange 22 forming a baffle for deflecting the water downwardly onto the disk 88 or onto the articles of a small nature mounted in the basket or receptacle 94. Thus the cleaning solution and water will be effectively brought into engagement with the articles to be cleaned at a relatively high velocity and with a relatively high volume. The tank of course may vary as to size but may be constructed for holding approximately 50 to 75 gallons of water with the motor having a relatively high horsepower rating and the pump being centrifugal with the pump forcing the water through the distributor pipe and jets whereby the water will be discharged downwardly and at high speed and under considerable pressure toward the bottom of the tank which causes the rolling washing action in the tank. The particular piping arrangement is such that by hooking a hose onto the fiting 78 and opening the valve 76 and closing the valve 72, the hose may be used for washing other various equipment such as floors, walls, other tanks, truck bodies or the like. By attaching the nipple 68 to a suitable line or pipe, and then opening the valve 70 and closing the valve 72, the pump may be used for pumping hot water and cleaning solution through in-place pipe lines or other equipment with the return line being connected to the T-coupling 58 by removing the closure cap 60 and providing suitable pipes for hook-up thus providing a unit which may effectively wash substantially all equipment employed in a dairy barn or in a milk room or creamery.

As an example of the type and size of equipment, the tank has been constructed of 16 gauge steel with all joints welded. The inside measurements of the tank are 60 inches long, 26 inches wide and 20 inches deep with the tank having a 60-100 gallon capacity. Overall length of the device is 72 inches with the overall width being 32 inches and height 39 inches. The basket or receptacle for the sanitary fittings, small parts, is 48 inches long, 20 inches wide and 9 inches high. In actual practice, the pump and motor have been used as a single unit and a two horsepower Worthington mono-block pump with a two inch suction and one and one-half inch discharge operating on 220 volts, 60 cycles, 3 phase A.C. 3600 r.p.m. has been employed and the casters are preferably four inch heavy duty casters. The supporting rod for the separator disk is one and one-half inch stainless steel and the overall shipping weight is approximately 650 pounds. The foregoing dimensions, sizes and weights have been set forth merely for purposes of exemplifying one embodiment of the invention with it being pointed that these devices may be altered or changed in any way desired. The device may be manufactured in both black steel (with blue paint) or stainless steel. This washer may also be used in laboratories, serum companies, food supply centers and in manufacturing factories or plants for washing tools and small parts. Another feature to be pointed out is that the header and the vertical portion of the discharge pipe 62 are all disposed within the overall confines of the side wall 14 and the handle 38 thus forming a compact unit which may be pushed substantially directly against a wall with the various valving arrangements being immediately accessible for using the device with any suitable hook-up.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A washer for dairy equipment comprising an elongated tank, means for supporting articles to be washed within said tank, means for supplying a liquid cleaning agent to said tank under pressure, means for directing the cleaning agent around a portion of the periphery of the tank and means incorporated in said tank for directing the cleaning agent onto the articles to be cleaned, said tank being provided with a substantially semi-cylindrical bottom and vertical side walls, one of the side walls having an inturned flange on the upper edge thereof, a depending flange on the inner edge of said inturned flange whereby said flanges form the means for directing the cleaning agent downwardly and inwardly onto the articles when the cleaning agent impinges against the flanges in a vertical manner along the inner surface of the vertical wall, said means for directing the cleaning agent along a portion of the tank including a series of horizontally flattened jet orifices disposed adjacent the opposite vertical wall and generally in tangential relation to the semi-cylindrical bottom of the tank whereby cleaning agent discharged from the jet orifices will sweep around the bottom of the tank and up the opposite vertical wall and deflected downwardly onto articles within the tank by the flanges, said means for supporting the articles within the tank including a pair of upwardly facing U-shaped clips mounted on opposite walls of the tank, and an elongated rod-like member extending between said clips and removably mounted therein whereby the rod may be inserted through a plurality of separator disks for mounting the disks within the tank.

2. A washer for dairy equipment comprising an elongated tank, means for supporting articles to be washed within said tank, means for supplying a liquid cleaning agent to said tank under pressure, means for directing the cleaning agent around a portion of the periphery of the tank and means incorporated in said tank for directing the cleaning agent onto the articles to be cleaned, said tank being provided with a substantially semi-cylindrical bottom and vertical side walls, one of the side walls having an inturned flange on the upper edge thereof, a depending flange on the inner edge of said inturned flange whereby said flanges form the means for directing the cleaning agent downwardly and inwardly onto the articles when the cleaning agent impinges against the flanges in a vertical manner along the inner surface of the vertical wall, said means for directing the cleaning agent along a portion of the tank including a series of horizontally flattened jet orifices disposed adjacent the opposite vertical wall and generally in tangential relation to the semi-cylindrical bottom of the tank whereby cleaning agent discharged from the jet orifices will sweep around the bottom of the tank and up the opposite vertical wall and deflected downwardly onto articles within the tank by the flanges, said means for supporting the articles to be cleaned in the tank including an elongated receptacle constructed of reticulated material, projecting flanges on the upper end of each side of said elongated receptacle for resting upon the edges of the tank wall whereby the cleaning agent will pass through the walls of the receptacle and engage the articles positioned in the reticulated material receptacle.

3. A washer for dairy equipment comprising an elongated tank, means for supporting articles to be washed within said tank, means for supplying a liquid cleaning agent to said tank under pressure, means for directing the cleaning agent around a portion of the periphery of the tank and means incorporated in said tank for directing the cleaning agent onto the articles to be cleaned, said tank being provided with a substantially semi-cylindrical bottom and vertical side walls, one of the side walls having an inturned flange on the upper edge thereof, a depending flange on the inner edge of said inturned flange whereby said flanges form the means for directing the cleaning agent downwardly and inwardly onto the articles when the cleaning agent impinges against the flanges in a vertical manner along the inner surface of the vertical wall, said means for directing the cleaning agent along a portion of the tank including a series of horizontally flattened jet orifices disposed adjacent the opposite vertical wall and generally in tangential relation to the semi-cylindrical bottom of the tank whereby cleaning agent discharged from the jet orifices will sweep around the bottom of the tank and up the opposite vertical wall and deflected downwardly onto articles within the tank by the flanges.

4. The combination of claim 3 wherein the jet orifices are disposed at the bottom of vertically extending down pipes, an elongated longitudinal header communicated with each of the down pipes with the header being disposed within the vertical confines of the tank, said means for supplying cleaning agent under pressure including a powered pump mounted under the tank and having an inlet communicating with the bottom of the tank and a discharge communicating with the header for recirculating liquid cleaning agent.

5. The combination of claim 4 wherein the discharge of the pump is connected to the header by a vertical pipe section, means in said vertical pipe section for valved connection with a hose and valved connection with a pipe line for cleaning other equipment.

6. The combination of claim 5 wherein said tank is supported on a plurality of casters, handle means for facilitating the moving of the tank, and means exteriorly of the tank for supporting the article holding means when not in place within the tank.

7. A washer for dairy equipment comprising an elongated tank, means for supporting articles to be washed within said tank, means for supplying a liquid cleaning agent to said tank under pressure, means for directing the cleaning agent around a portion of the periphery of the tank, and means incorporated in said tank for directing the cleaning agent onto the articles to be cleaned, said tank being provided with a substantially semi-cylindrical bottom and vertical side walls, one of the side walls having an inturned flange on the upper edge thereof, a depending flange on the inner edge of said inturned flange whereby said flanges form the means for directing the cleaning agent downwardly and inwardly onto the articles when the cleaning agent impinges against the flanges in a vertical manner along the inner surface of the vertical wall, said means for supporting articles within the tank including a pair of upwardly facing U-shaped clips mounted on opposite end walls of the tank, and an elongated rod-like member extending between said clips and removably mounted therein whereby the rod may be inserted through a plurality of separator disks for mounting the disks within the tank, said means for directing cleansing agent around a portion of the periphery of the tank including a plurality of pressure nozzles disposed tangentially to the semi-cylindrical bottom of the tank.

References Cited in the file of this patent

UNITED STATES PATENTS

| | | |
|---|---|---|
| 160,178 | Gething | Feb. 23, 1875 |
| 569,606 | Blakeslee | Oct. 20, 1896 |
| 1,114,464 | Giles | Oct. 20, 1914 |
| 1,382,992 | Lombard | June 28, 1921 |
| 1,678,037 | Dunn | July 24, 1928 |
| 1,914,016 | Hobi | June 13, 1933 |
| 2,250,314 | Rocke | July 22, 1941 |